Patented May 9, 1933

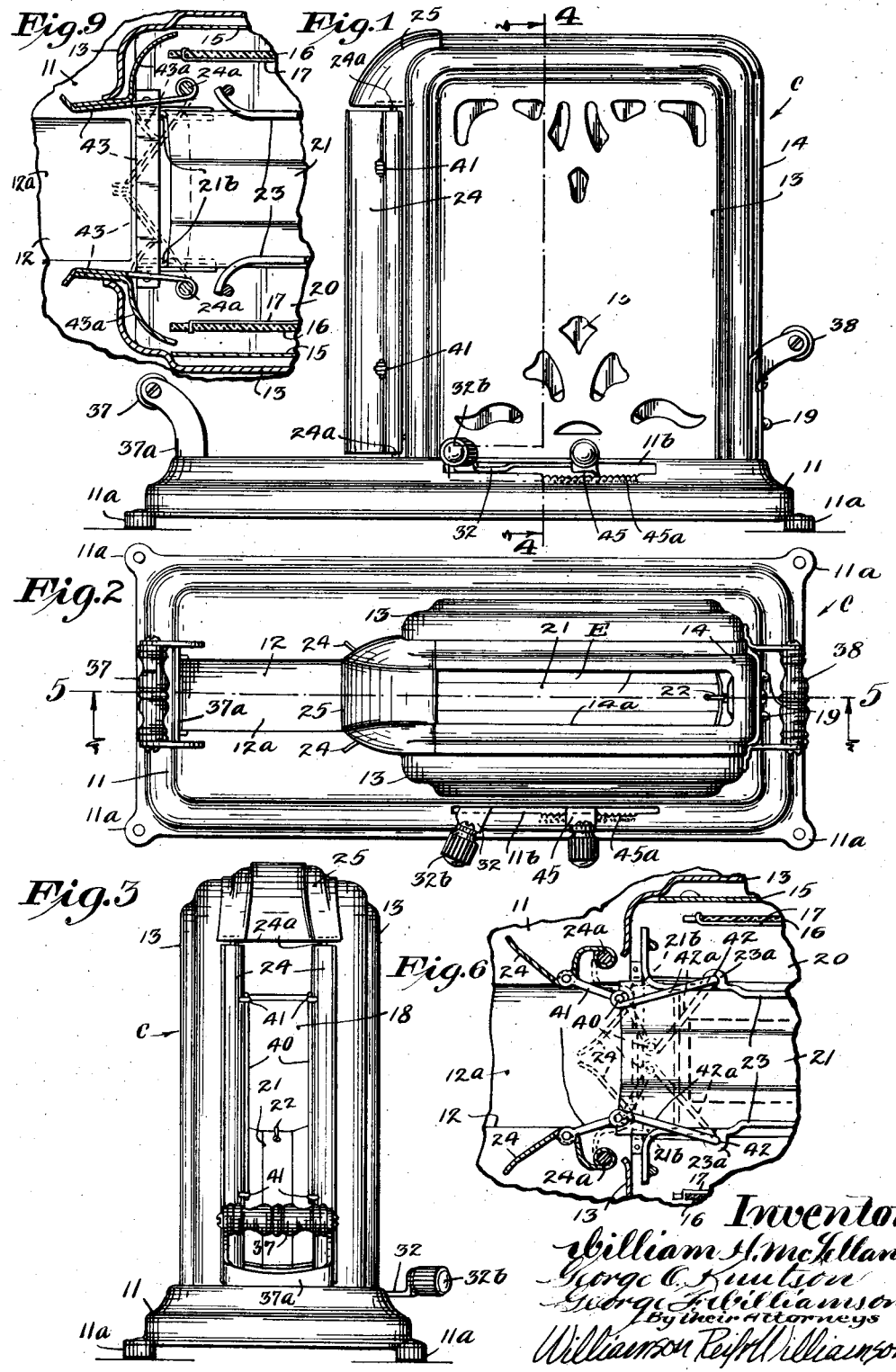

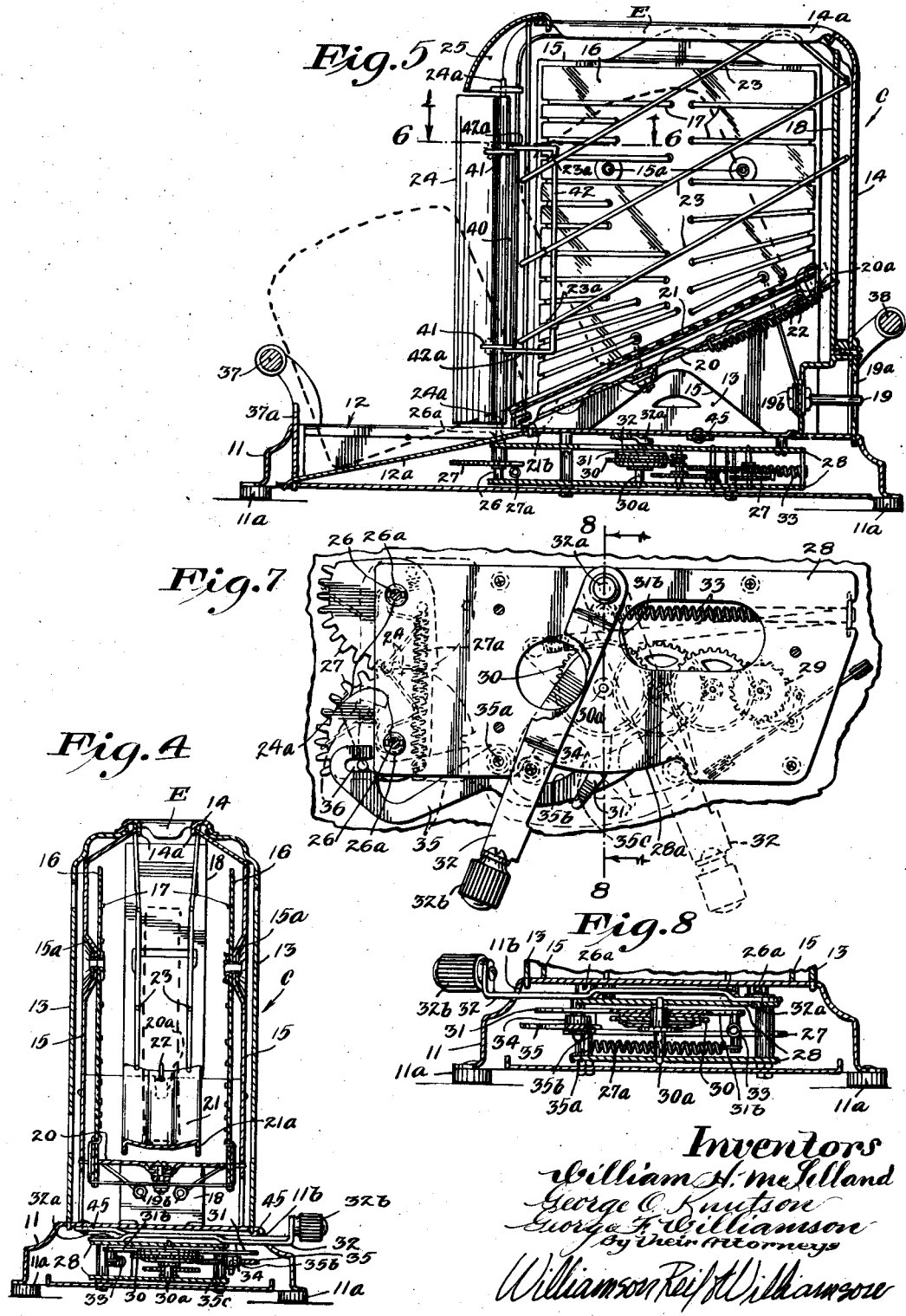

1,907,650

UNITED STATES PATENT OFFICE

WILLIAM H. McLELLAND, GEORGE O. KNUTSON, AND GEORGE F. WILLIAMSON, OF MINNEAPOLIS, MINNESOTA, ASSIGNORS TO DOMINION ELECTRICAL MFG. COMPANY, OF MINNEAPOLIS, MINNESOTA, A CORPORATION OF MINNESOTA

TOASTER

Application filed March 28, 1930. Serial No. 439,638.

This invention relates to automatic cooking appliances, and particularly to an automatic toaster, wherein the bread or other material is subjected to heat for a predetermined period of time.

It is an object of our invention to provide a simple and efficient toaster or analogous cooking appliance wherein the bread or other material will be toasted in an oven or heating chamber for a predetermined length of time and will then be caused to remove itself therefrom.

A further object is to provide an automatic toaster of the class above described, wherein the period of time during which the bread or material is toasted may be varied as desired within, of course, certain limits.

Another object is to provide means for receiving the toast when it is discharged from the oven and for holding the toast on edge to enable it to be easily grasped and removed.

More specifically, it is an object of our invention to provide an automatic toaster which has a vertical oven with an inclined support or chute therein for receiving the bread or material on edge, and which has a discharge opening in one of the vertical ends thereof through which the toasted material will slide by gravity and which has associated therewith time controlled mechanism for retaining the bread or material within the casing or oven for a predetermined period.

These and other objects and advantages of the invention will be fully set forth in the following description made in connection with the accompanying drawings wherein like reference characters refer to similar parts throughout the several views, and wherein, Fig. 1 is a side elevation of an embodiment of the invention;

Fig. 2 is a plan view of the same;

Fig. 3 is a front elevation;

Fig. 4 is a cross section taken on line 4—4 of Fig. 1;

Fig. 5 is a vertical section taken on line 5—5 of Fig. 2;

Fig. 6 is a fragmentary cross section taken on line 6—6 of Fig. 5;

Fig. 7 is a fragmentary view showing the clockwork mechanism in plan;

Fig. 8 is a cross section taken on line 8—8 of Fig. 7; and

Fig. 9 is a fragmentary cross section showing a slightly different type of hinge door construction.

Referring to the embodiment of the invention illustrated in Figs. 1 to 8 inclusive, we provide a vertically disposed rectangular casing, designated as an entirety by the letter C, which with the associated heating elements mounted therein, constitutes a toasting oven. Casing C is mounted on an elongated hollow base 11 which, as shown, is supported on feet 11a, preferably constructed of heat insulating material. The forward end of base 11 projects for some distance beyond the forward vertical end of the casing for a purpose which will later be apparent and has a central and longitudinally extending inclined groove 12 therein, the bottom of said groove being defined by an inclined plate 12a, the rear and upper end of which is secured to base 11 just below the forward vertical end of casing C and the lower and forward end of which is supported at a point at the forward end of the base and adjacent the lower edges of the base.

Casing C may be of any suitable construction, but, as shown, comprises a pair of rectangular ornamental side walls 13 secured at their lower edges to the top of base 11 and connected together at their rear vertical edges by a rear end plate 14, which, as shown, has a horizontally and angularly extending top piece 14a integrally formed therewith, which engages the upper edges of sides 13 to reinforce and space said sides apart. The top piece 14a is provided with an elongated entrance slot E, through which a piece of bread or other material may be inserted. The front vertical end of casing C is open, the forward edges of sides 13 defining a slot D or aperture which communicates with the groove 12 for the discharge of the toast.

Within casing C a pair of vertical mounting plates 15 are secured extending in close parallel relation to the sides 13 and having their lower edges suitably connected with the top of base 11. The upper ends of mounting plates 15 may be inturned at an obtuse angle to the plates to engage at their upper edges the downturned flanges of top piece 14a which defines the entrance slot E. As shown, the mounting plates 15 are provided with inwardly protruding bossed portions 15a, to which are suitably attached the vertical mica sheets 16 or other supports for the heating elements.

While we prefer to employ electrical heating elements it will, of course, be apparent that any suitable source of heat within casing C may be provided, all within the scope of our invention.

The heating elements illustrated comprise nichrome wires 17 supported for the most part on the inner surface of the mica sheets 16 and conveniently carded or wound about notched portions at the vertical edges of the mica sheets and passed through suitable apertures in said sheets in a manner well known to those skilled in the art. A vertical terminal supporting plate 18 is mounted within casing C in close spaced relation to the rear end wall 14 and, as shown, said plate has an offset lower end, which is fixed to the top of base 11 and which carries a pair of horizontally and rearwardly projecting electrical terminals 19 accessible through a slot 19a formed in the rear of the casing. Said terminals are adapted to be received in the sockets of a conventional electric plug, not shown. Terminals 19 carry binding posts 19b disposed on the forward surface of the terminal mounting plate 18 and the heating elements 17 are electrically connected with said binding posts to complete an electrical circuit through the heating elements on opposite sides of casing C. While the heating elements are illustrated as being connected in series it will, of course, be obvious that the same may be connected in multiple if so desired.

An inclined supporting plate 20 is mounted within casing C extending from the forward end to the rear thereof and traversing the side walls 13. The rear and upper end of said plate may be secured to the vertical terminal supporting plate 18 and the longitudinal edges of the plate may be secured to the element mounting plates 15, as shown in Fig. 4. The lower and forward end of plate 20 may rest upon the top of the base 11. A detachable chute and toast supporting member 21 is supported upon and connected with supporting plate 20 and as shown, comprises a concavoconvex strip having narrow downturned flanges 21a, which engage the upper surface of plate 20. The rear and upper end of chute 21 is engaged by the laterally extended end of a spring 22, said end projecting through a slot 20a in supporting plate 20, while the forward and lower end of chute 21 is provided with a hook 21b which works in a slot 20b formed in the lower and forward end of plate 20. The chute is thus connected with its supporting plate 20 for limited longitudinal sliding movement and is normally held by spring 22 in forwardly projected position with its forward and lower end projected slightly beyond the discharge opening in the forward vertical end of casing C, and at a point above the rear and upper end of the groove.

A pair of gratings 23, each comprising a series of inclined rods are mounted in casing C, each of said gratings being substantially alined with one of the edges of the entrance opening E and serves to properly position the bread or other material to be toasted and to hold the same in proper spaced relation to the heating elements 17.

A pair of cooperating vertical doors 24 are hinged at the forward and discharge end of casing C and may comprise narrow plates fixed to vertical hinge rods 24a, the upper ends of which are journaled in suitable flanges or brackets provided by an overhanging cowl 25 and the lower ends of which are keyed to a pair of collars 26a which are fixed to the upper ends of short vertical shafts 26 (see Figs. 5 and 7), as shown, said shafts being mounted in the clockwork frame and alined transversely of the base 11. As shown, the hinged edges of the doors are offset from the body portions thereof in such a manner that the body portions will be angled when closed, thereby requiring less rotative movement on the hinge rods 24a to swing the doors to a full open position and furthermore serving to guide and center the discharge of the toast relative to the chute 21 and groove 20. The vertical shafts 26 carry meshed gear segments 27, which are eccentrically connected by a coiled spring 27a to normally hold the doors 24 in open position.

The opening and closing of doors 24 is controlled by suitable timing mechanism, such as the clockwork device illustrated, which, as shown, is mounted in the hollow base 11. The clockwork mechanism comprises a suitable frame 28 comprising spaced horizontal plates between which is mounted the usual train of gears, the last gear of the train being controlled by an escapement mechanism 29 of the balance wheel type. The large gear of the train numbered 30 is mounted on a shaft 30a which, as shown, is positioned substantially centrally of the clockwork frame 28 and said shaft and gear have frictionally secured thereto an actuating lever 31 having a yoke 31a at the outer end thereof, which yoke is adapted to swing adjacent one edge of the frame 28. Frictional connection between lever 31, gear 30 and shaft 30a may be made in any suitable manner, such as by a friction washer and a resilient washer disposed between the parts and a flange or collar mounted on shaft 30a. An auxiliary lever 32 is pivoted to the top of clockwork frame 28, as shown, its pivot 32a being alined with shaft 30a transversely of the base of the toaster and the outer end of lever 32 works through an elongated horizontal slot 11b formed in one of the longitudinal sides of base 11. A suitable handle 32b is secured to the outer extremity of lever 32 to facilitate the re-setting of the clockwork mechanism. The clockwork mechanism, as shown, is actuated by means of an elongated coiled spring 33 secured at one end to the rear end of frame 28 and secured at its forward end to a short arm 31b which is integrally formed with the actuating lever 31.

The lever 32 carries a depending roller 34, which extends below the upper plate of clockwork frame 28 and which is confined between the arms of yoke 31a of the actuating lever. The upper plate of frame 28 may be recessed and cut along an arcuate line 28a extending concentric with the pivot 32a of lever 32 to accommodate rollers 34, said recessed portion leaving abutment shoulders to limit the forward and rearward swinging movement of the lever 32.

An elongated door controlling lever 35 is mounted within the clockwork frame 28 pivoted on a vertical pin 35a and the forward end of said lever is somewhat hook-shaped and has a slot and pin connection 36 with one of the gear segments 27 connected with the door operating shafts 26. The rear and longer end of door actuating lever 35 has a cam track 35b on its inner longitudinal edge, which the roller 34 of lever 32 engages and the rear section of the cam edge is curved concentric with the pivot 32a of the lever 32 when the door actuating lever 35 is swung to closed position, indicated in Fig. 7 by the dotted lines. The camming edge 35b of the door actuating lever includes a trip point 35c and a recessed portion between said trip point and the pivot of the lever in order that the roller 34 may hold the door lever in closed position for a predetermined portion of its swinging movement and may suddenly become disengaged from the door actuating lever at the point 35c whereby the coiled spring 27a will quickly snap the doors to open position.

An upwardly projecting handle 37 is secured to the forward end of base 11 and includes a plate 37a which depends through the top of base 11 and constitutes the forward end of the toast receiving groove 12, the handle proper extending above said forward end of the groove and transversely thereof and constituting an abutment, as shown in Fig. 5, for engagement with a piece of toast discharged.

Another handle 38 may be secured to the rear vertical end 14 of casing C.

We provide means associated with the discharge end of casing C and the doors 24 for holding the bread or other material inwardly of the discharge aperture or doorway D and for also centering the material edgewise upon the chute 21 and for also assisting in holding the discharged toast edgewise in the groove 12 to facilitate removal thereof from the toaster. Two elective mechanisms are illustrated for this purpose, one being shown in Figs. 5 and 6 and another illustrated in Fig. 9.

Referring to the form illustrated in Figs. 5 and 6, we provide a pair of opposed vertical rods 40 each being connected at its upper and lower ends by toggle arms 41 and 42a with one of the doors 24 and eyes 23a formed in the grating rods 23 adjacent the discharge doorway. The arms 42a connected with the upper and lower ends or rods 40 may be integrally formed and connected together by a vertical rod 42, which passes through the eyes 23a.

As shown in Fig. 6, in dotted lines, when the doors are in closed position the rods 40 will be in juxtaposition with the arms 42a diverging and serving to center the toast edgewise upon platform 21 and to hold the forward edge of the piece of toast inwardly of the discharge opening D of casing C in order that the material will be toasted uniformly to the forward edge thereof.

The same results may be obtained, as shown in Fig. 9, by mounting the door hinges 24a within the casing C and inwardly of the discharge aperture. The doors numbered in Fig. 9, as 43, are in the form of flat plates and carry arcuate cowls 43a disposed concentrically of the hinge rods 24a and swingable with the opening and closing of the doors in close relation to the edges of casing C defining the door opening D to exclude a substantial draft of air between the doors and doorway when the doors are closed. It will be seen that in this form the doors 43 are positioned substantially similar to the arms 42a in the form previously described and will hold the toast inwardly of the doorway, centering the same edgewise upon the chute 21 when the doors are open and will assist in guiding the toast edgewise down the chute and down the slot 12, engaging the vertical sides of the toast when the toast is fully delivered and engaged with the abutment 37a at the forward end of groove 12.

The period of time during which the bread or material is toasted may be varied by means of an adjustable stop lever 45, the outer end of which works through the slot 11b in one of the longitudinal sides of base 11 and the inner end of which may be conveniently pivoted beneath the top of base 11, as shown in Figs. 4 and 5. Stop lever 45 is provided at its rear edge with a depending tooth which is adapted to engage a rack 45a formed on a portion of the lower horizontal edge which defines the elongated slot 11b.

Operation

Assuming the adjustable stop lever 45 adjusted as desired, with reference to the rack 45a, the setting lever 32 is swung rearwardly into abutment with the stop lever 45, the swinging of said lever through engagement of its cam roller 34 with door control lever 35 causing the doors to be closed and simultaneously swinging the actuating lever 31 rearwardly to set the clockwork mechanism. A slice of bread, cracker or other article to be toasted is then dropped through the entrance slot E at the top of the casing and falls upon the chute 21 in edgewise position, its forward end being engaged by the doors, if the structure is made in accordance with Fig. 9, or by the arms 42a and rods 40, if the door mechanism includes the elements illustrated in Figs. 5 and 6. The bread or other material is thus held in the oven and subjected to the constant heat from the heating elements. The current or heat supply is not interrupted during the operation of our device.

The clockwise mechanism causes the actuating lever 31 to be slowly moved in a forwardly direction, swinging with it the setting lever 32, since the roller 34 carried by lever 32 is confined between the arms 31a of the yoke of actuating lever 31. As soon as the cam roller 34 passes the tripping point 35c on the inner longitudinal edge of door control lever 35, the doors will be released and will be snapped open by means of coil spring 27a and the toast which has been supported in the oven will quickly slide down the chute 21 through the discharge doorway D and down the inclined plate 12a of the groove 12 in the forward end of the base, and will be limited in outward movement by abutment with the handle 37. The sides of groove 12 and the open doors engage the sides of the toast and hold the same in edgewise position at the forward projecting portion of the base, whereby the toast may be conveniently grasped and removed from the toaster.

It will be noticed that the closing movement of the doors presses chute 21 inwardly and rearwardly within casing C against the tension of the spring 22. When the doors are snapped open, chute 21 is released and spring 22 causes a sharp forward jerk upon the chute giving the toast or other material an initial forward impetus to expedite and facilitate the downward sliding movement of the toast through the discharge opening D.

The abutment or adjusting lever 45 may be swung to various desired positions and engaged with the teeth of rack 45a to vary the tensioning of the clockwork actuating spring 33 and also the swing of the actuating lever 31 in order that the timing may be adjusted as desired according to the degree of crispness desired for the toast and also to allow for the amount of moisture in the bread, moist bread, of course, taking longer to properly toast than dry bread.

The chute 21 may be removed from casing C for cleaning by pressing the forward end of the chute inwardly to extreme position and thereby disengaging hook 21b from the forward end of the slot in supporting plate 20 and then slipping the chute upwardly.

It will be seen that the bread may be toasted very quickly with our device, since the oven is always heated after the first piece of toast is made and since the setting of lever 32 closes the door, excluding a draft of air through the forward vertical end of the toaster. The door mechanism retains the toast upon the supporting chute and when actuated by the time controlled mechanism, releases the toast, whereby gravity causes the same to slide downwardly and out of the oven.

From the foregoing description, it will be seen that we have invented a comparatively simple and highly efficient automatic toaster adapted for household use and further well adapted to be combined in multiple into a compact commercial toaster for restaurants. This will be apparent since the toast is made vertically in a relatively narrow casing.

It will, of course, be understood that various changes may be made in the form, details, arrangement and proportions of the parts without departing from the scope of our invention, which, generally stated, consists in a device capable of carrying out the objects above set forth, such as shown and described and defined in the appended claims.

What is claimed is:

1. In a toaster, a vertical oven provided with heating elements, a discharge opening in one of the vertical ends of said oven, an inclined support in said oven for supportting material to be toasted on edge, means associated with said inclined support for retaining material within said oven, and time controlled means for releasing said retaining means whereby said material will slide down said support through said discharge opening.

2. In a toaster, a base, a casing mounted on said base, said base projecting beyond the forward end of said casing, a vertical oven in said casing provided with heating elements, said oven having a discharge opening through the forward end of said casing, means for retaining material within said casing, time controlled means for releasing said retaining means whereby gravity will cause said material to remove itself from said casing through said discharge opening, and toast receiving means on the projecting portion of said base adapted to limit the outward movement of said toast and to hold the toast in edgewise position to facilitate removal thereof from said base.

3. In a toaster, a casing having a pair of vertical sides, and a pair of relatively narrow vertical ends, one of said ends being provided with an elongated opening for the discharge of material, heating elements mounted in said casing, a chute in the lower portion of said casing communicating with said discharge opening, a pair of doors hinged on vertical axes for closing said discharge opening and for also retaining a slice of bread or other material on said chute within said casing, and time controlled means for opening said doors whereby said material will remove itself through said opening.

4. The structure set forth in claim 3, and means associated with the forward end of said casing for receiving the discharged material and holding the same on edge.

5. In a toaster, an oven having an opening in one end thereof for discharge of material, a pair of oppositely swingable doors for closing said discharge opening and retaining material within said oven, operating connections between said doors, means for urging said doors to open position, a door control lever connected with said doors and time controlled mechanism connected with said door control lever for retaining said lever in door closing position for a predetermined period and then releasing said lever.

6. In a toaster, a vertical oven having an opening in one of the vertical ends thereof for the discharge of material, a door in said opening, an inclined chute in the lower portion of said oven communicating at its lower end with said opening, said chute being mounted for limited longitudinal sliding movement, means for impelling said chute outwardly in the direction of said door, the outer end of said chute being disposed in the path of said door, whereby said chute will be pressed inwardly against said impelling means when said door is closed, and time controlled mechanism for controlling the opening of said door.

7. The structure set forth in claim 6, wherein said chute is removably mounted within said oven.

8. In a toaster, a casing having an oven therein for receiving a piece of bread in vertical position and provided with heating elements, said casing having a vertical forward end provided with an opening communicating with said oven for the discharge of material, means within said oven for urging material outwardly in the direction of said discharge opening, closure means for retaining material within said oven and for also closing said discharge opening and time controlled means for opening said closure means.

In testimony whereof we affix our signatures.

WILLIAM H. McLELLAND.
GEORGE O. KNUTSON.
GEORGE F. WILLIAMSON.